Patented Jan. 24, 1939

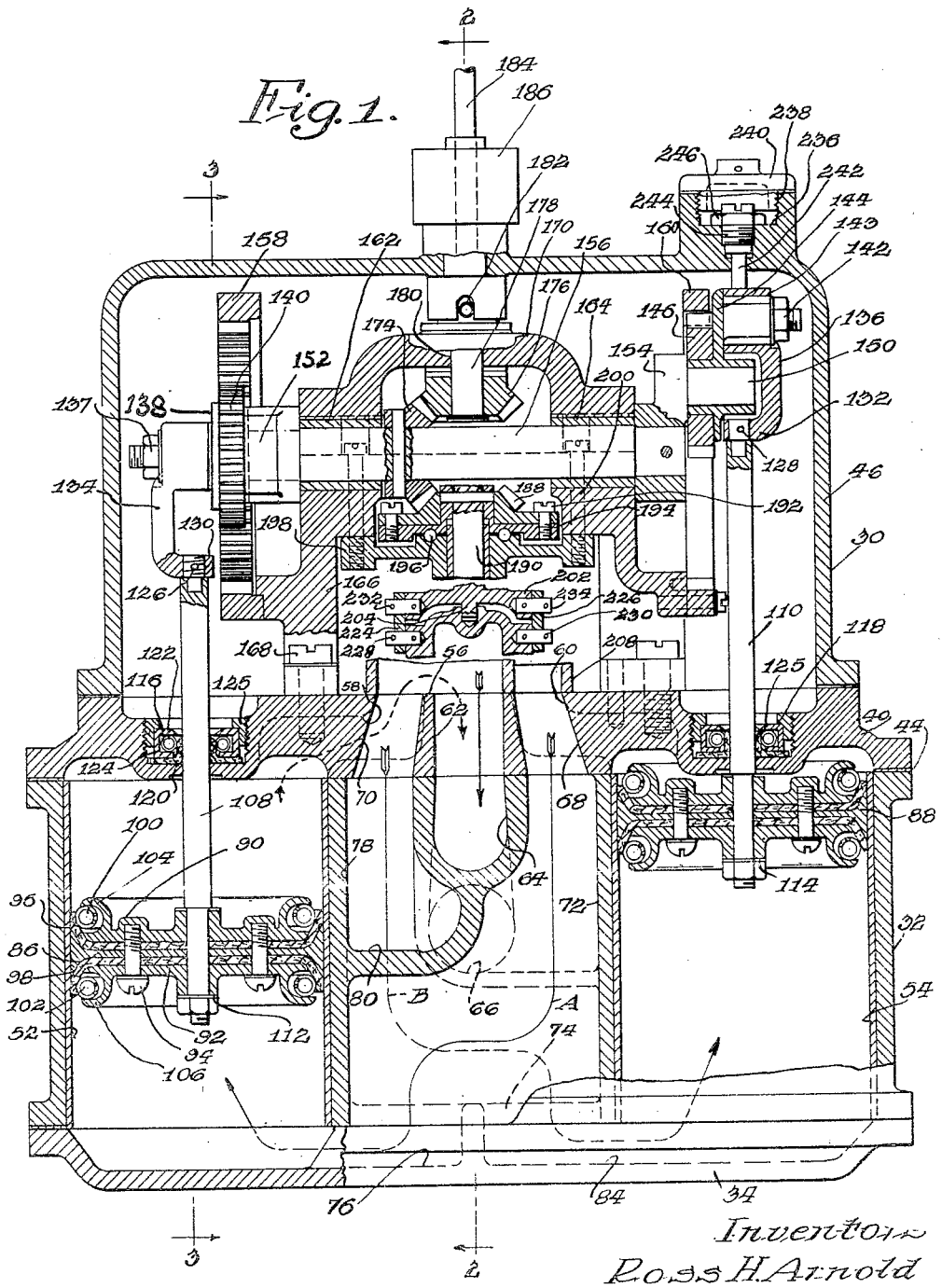

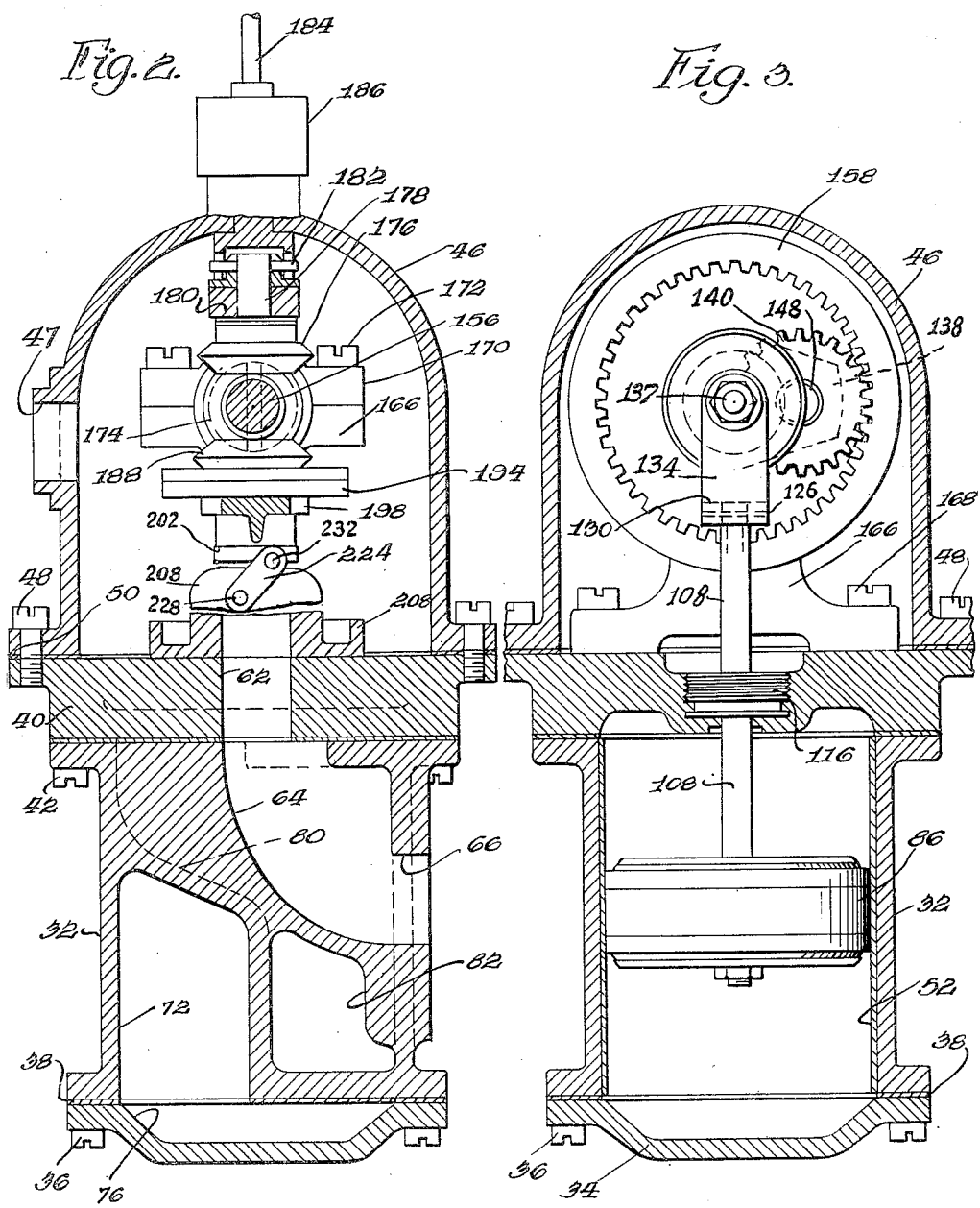

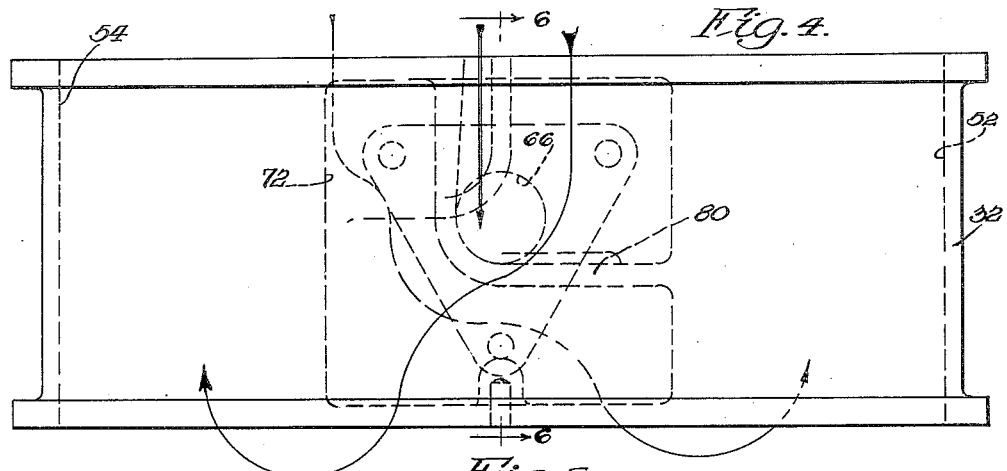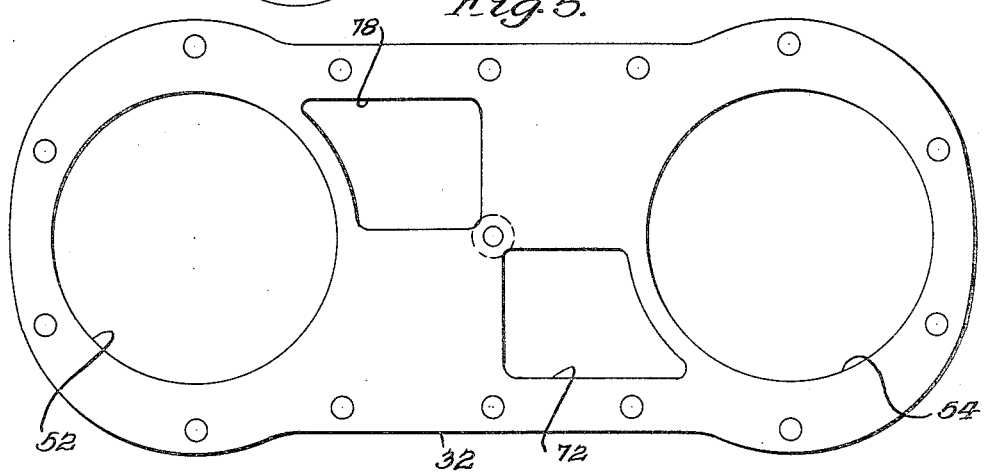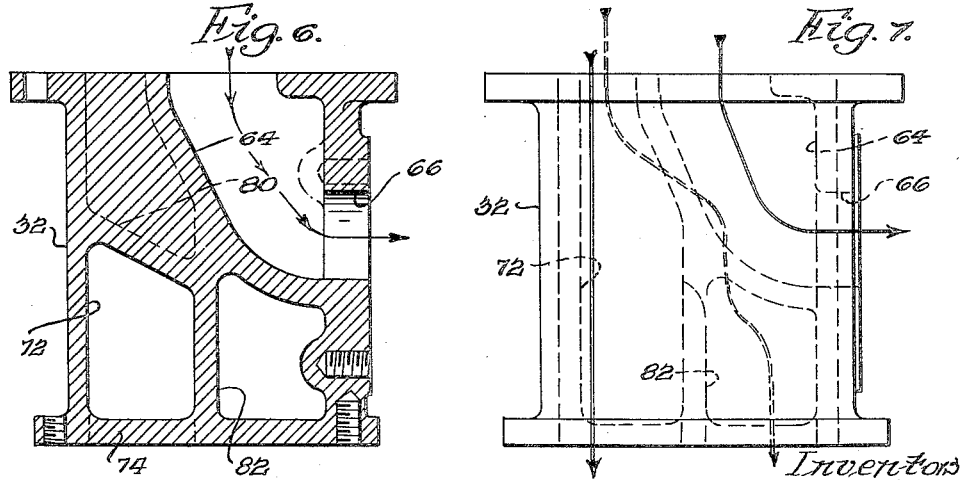

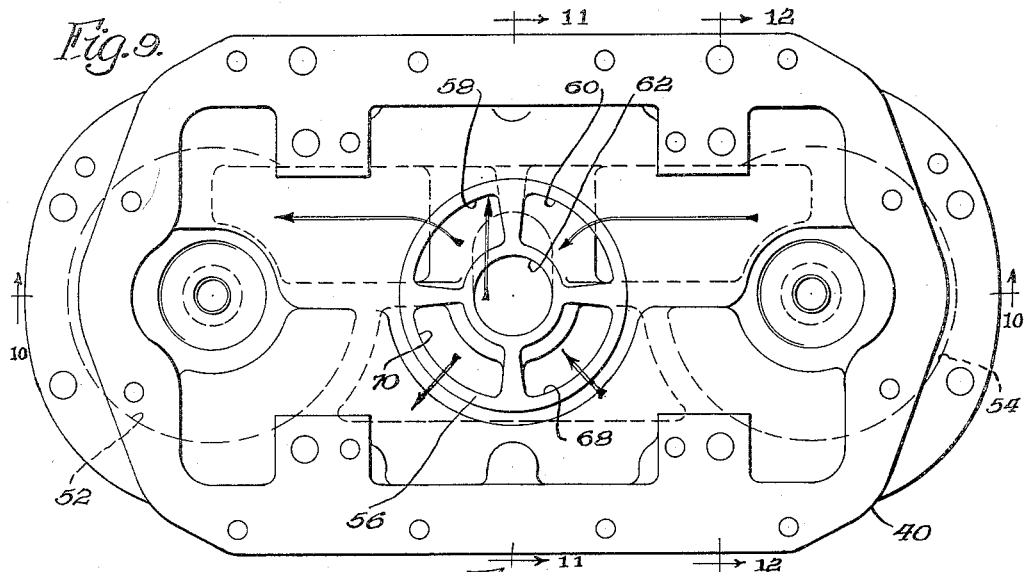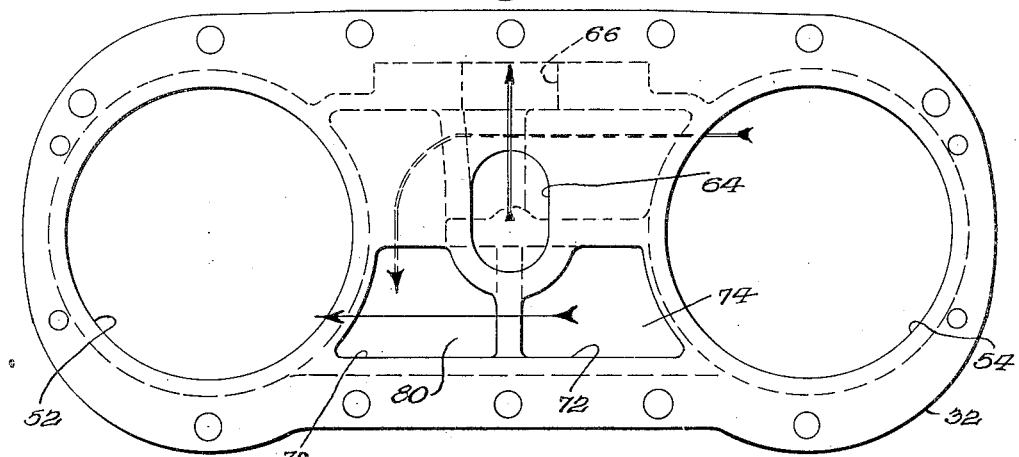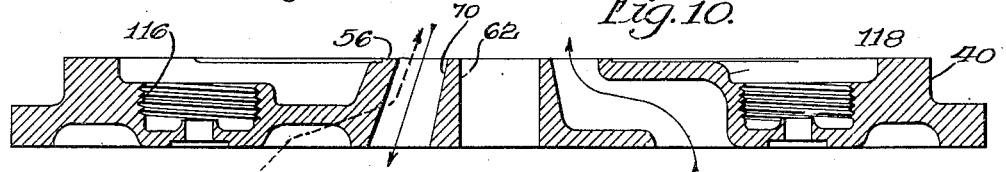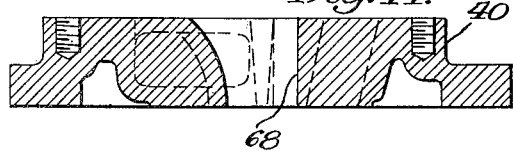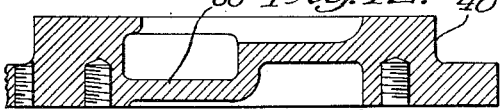

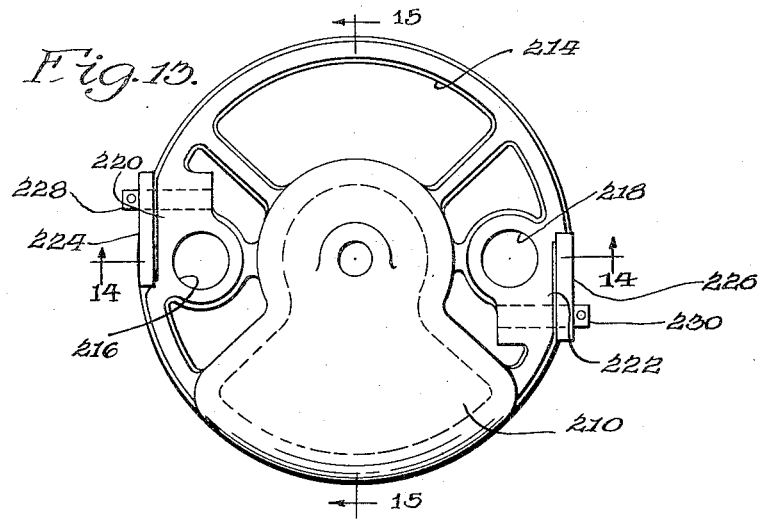
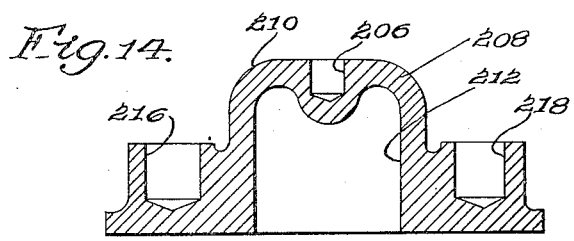
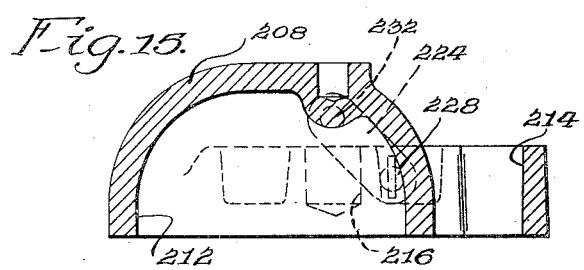
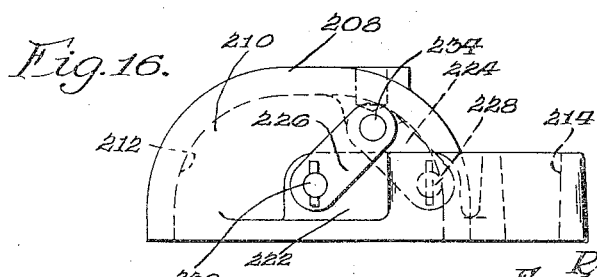

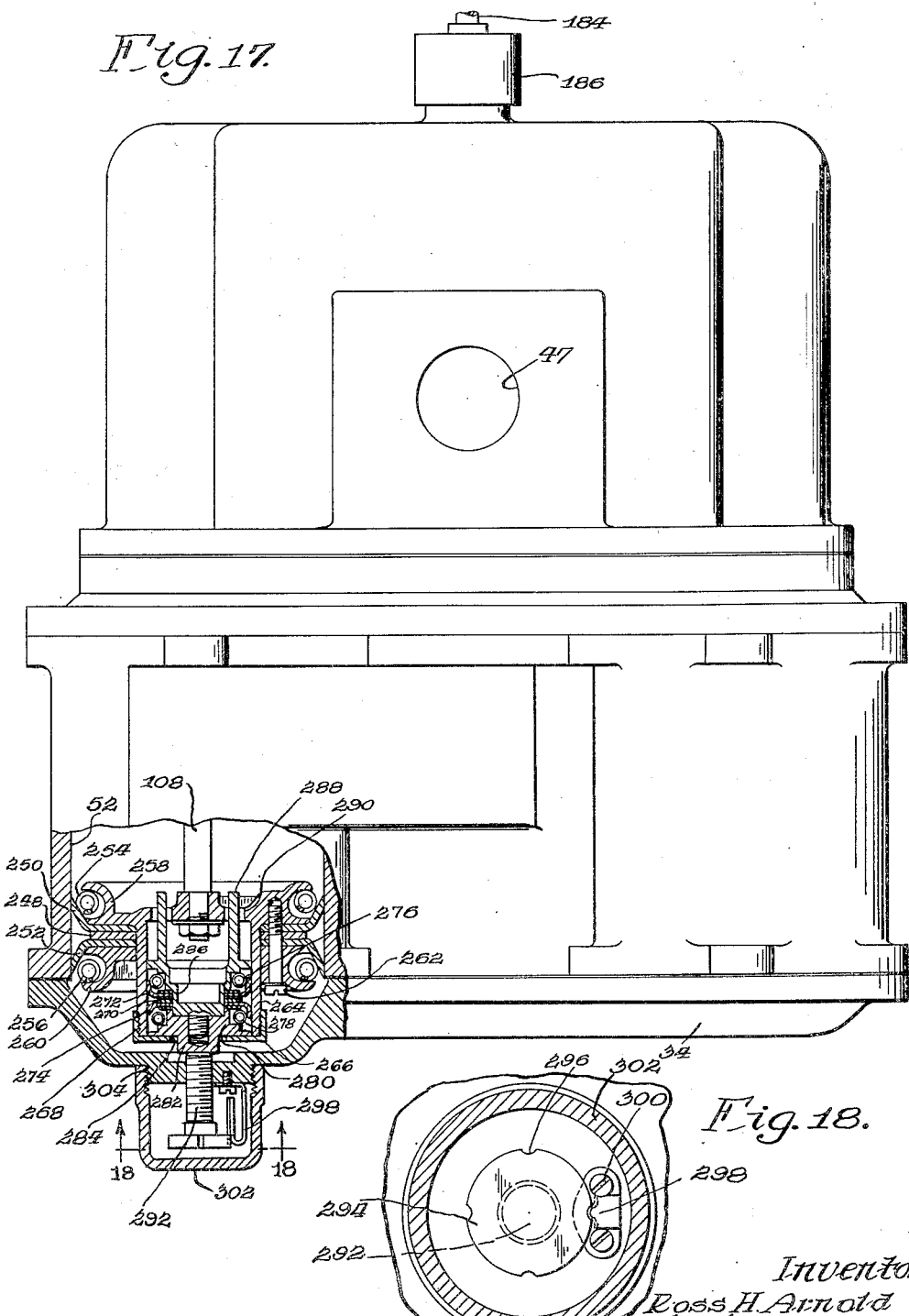

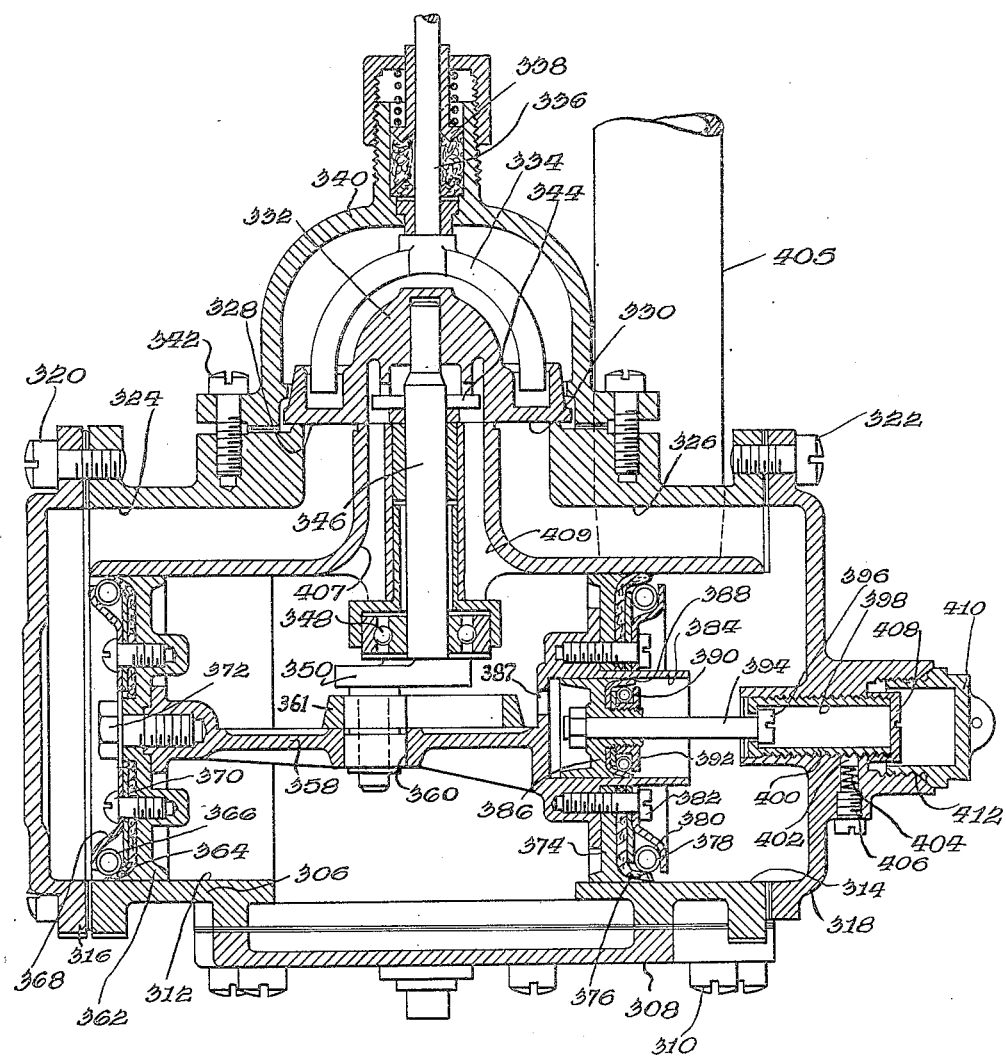

2,144,748

UNITED STATES PATENT OFFICE 2,144,748

FLUID METER

Ross H. Arnold and Frederick W. Sturm, Fort Wayne, Ind., assignors to The Wayne Pump Company, Fort Wayne, Ind., a corporation of Maryland Application June 15, 1936, Serial No. 85,426

19 Claims. (Cl. 73—246)

This invention pertains to a fluid meter particularly adaptable for use in connection with service station equipment.

It is an object of this invention to provide a meter of the reciprocating type, wherein liquid is caused to be dispensed from the meter at substantially a constant rate.

Another object of the invention is to provide a positive displacement meter wherein the weight or force of the pistons against the cylinder walls incident to the operation of said meter is removed from the cylinder walls.

Still another object of the invention is to provide a meter wherein there is substantially a straight line motion from the piston to control means for the meter valve, and wherein there is provided an increased turning moment as a piston approaches the dead point, the pistons in said meter being arranged so that when one is on dead center another is driving.

Yet another object of the invention is to provide a double acting piston type meter wherein the angularity of the piston rod is diminished to zero and wherein the piston doing the driving at a dead point has substantially double the power of that of the ordinary piston type meter using an ordinary crank and pivoted piston rod connection to the cylinder.

A further object of the invention is to provide a piston drive mechanism for a meter wherein the tendency of jamming or cocking of the pistons is eliminated with a consequent decrease in piston wear.

A still further object of the invention is to provide a meter of long stroke, whereby a large turning movement can be obtained with a small applied force and wherein substantially a small meter can be used to obtain this result.

A yet further object of the invention is to provide a double acting meter having a long stroke and wherein a slow operating meter can be obtained to thereby increase the life of said meter and wherein a decrease in wear on relatively movable parts is obtained, obviating the necessity of numerous adjustments and replacements to maintain meter accuracy.

Another further object of the invention is to provide a valve mounting in a meter which relieves the pressure on the valve seat, yet at the same time a proper seating of the valve is obtained with the further advantage that sticky valves are prevented by the motion imparted to the valve, tending to relieve any tendency of sticking by movement normal to the valve seat rather than only in the plane of the valve seat or in a plane parallel thereto.

A different object of the invention is to provide a piston adjustment wherein extreme accuracy can be obtained, yet at the same time the driving power of the piston is applied for the full limit of the stroke instead of rendering a portion or all of the piston inoperative at the arresting point of the adjustment.

A still different object of the invention is to provide a meter adjustment which entirely relieves any tendency of locking the meter due to any tendency of the adjustment jamming.

Another different object of the invention is to provide a meter adjustment wherein the adjustment in the piston includes a mounting that is other than metal to metal, thereby relieving any tendency of the adjustment to freeze.

A yet different object of the invention is to provide a different acting meter, having a plurality of pistons but wherein a double acting piston adjustment is provided on only one piston of said meter.

It is also important that the valve mounting elminate uneven wear on the valve and seat so that the discharge side of the valve wears at the same rate as the inlet side.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is an enlarged sectional elevation of a meter embodying the invention, a portion of the control valve being arbitrarily turned through 90° to show the link and pin connection;

Figure 2 is a transverse sectional elevation taken substantially in the plane as indicated by the line 2—2 of Figure 1, a portion of the control valve being arbitrarily turned through 90° to show the link and pin connection;

Figure 3 is a transverse sectional elevation taken substantially in the plane as indicated by the line 3—3 of Figure 1;

Figure 4 is a side elevation of the cylinder casing of the meter illustrated in Figures 1, 2 and 3;

Figure 5 is a bottom plan view of the cylinder casing illustrated in Figure 4;

Figure 6 is a transverse sectional elevation taken substantially in the plane as indicated by the line 6—6 of Figure 4;

Figure 7 is a side elevation looking toward the right as viewed in Figure 4;

Figure 8 is a top plan view of the cylinder casing illustrated in Figures 4 to 7 inclusive;

Figure 9 is a top plan view of a top cover plate for the cylinder casing;

Figure 10 is a longitudinal sectional elevation taken substantially in the plane as indicated by the line 10—10 of Figure 9;

Figure 11 is a transverse sectional elevation taken substantially in the plane as indicated by the line 11—11 of Figure 9;

Figure 12 is a transverse sectional elevation taken substantially in the plane as indicated by the line 12—12 of Figure 9;

Figure 13 is an enlarged top plan view of the rotary valve of the meter illustrated in Figure 1;

Figure 14 is a transverse sectional elevation taken substantially in the plane as indicated by the line 14—14 of Figure 13;

Figure 15 is a transverse sectional elevation taken substantially in the plane as indicated by the line 15—15 of Figure 13;

Figure 16 is a side elevation of the rotary valve looking toward the left as viewed in Figure 13;

Figure 17 is a side elevation, partly in section, of the meter illustrated in Figures 1 to 16 inclusive, showing a modified form of piston adjustment;

Figure 18 is an enlarged end elevation, partly in section, of the setting device for the modified form of adjustment, the same being taken substantially in the plane as indicated by the line 18—18 of Figure 17;

Figure 19 is a sectional elevation through a modified form of meter having an embodiment of the modified form of piston adjustment applied thereto.

Referring first of all more particularly to the meter construction illustrated in Figures 1 to 16 inclusive, the meter, which is of the displacement type, includes the casing 30, the top cover plate 40, and the cylinder casing 32 closed at the bottom by means of the bottom cover plate 34 suitably secured thereto as at 36, a gasket 38 preferably being interposed between the bottom cover plate and the cylinder casing. The upper part of said casing 32 supports the top cover plate 40 secured thereto as at 42, a gasket 44 being interposed between the cylinder casing and the top cover plate. A top closure dome or casing 46 provided with an inlet 47 is secured to the top cover plate as at 48, a gasket 50 being interposed therebetween.

The cylinder casing 32 is provided with longitudinally extending spaced cylinders 52 and 54, the longitudinal axes thereof being parallel to each other, and a rotary valve seat 56, provided on the top cover plate, is interposed between said cylinders, said seat being provided with ports 58 and 60 communicating respectively with the top of the cylinders 52 and 54. The valve seat is also provided with the centrally disposed port 62 extending downwardly and outwardly through the passage 64 provided in the cylinder casing to a suitable outlet 66. The ports 58 and 60 are arranged radially and circumferentially of the port 62 as are also ports 68 and 70. The port 68 communicates with the downwardly extending channel 72 formed in the cylinder casing, said channel adjacent the base of said casing being directed toward the left as viewed in Figure 1 by the bottom wall 74, whereby the channel is directed toward and communicates with the bottom of the cylinder 52 through the channel 76 formed in the bottom cover plate 34. The arrow A shown in Figure 1 illustrates the path of connection.

The port 70 for the cylinder 54 communicates with the passage 78 provided in the cylinder casing, said passage being deflected by the wall 80 and extending downwardly, communicating with the passage 82 (Figure 2), the passage 82 communicating with the passage 84 in the bottom cover plate 34 which in turn communicates with the bottom of the cylinder 54. An arrow B is shown in Figure 1 illustrating the path of liquid flowing downwardly to the bottom of the cylinder 54.

The cylinders 52 and 54 are provided, respectively, with slidable pistons 86 and 88. Said pistons may be of any suitable construction including the upper and lower cover plates 90 and 92 suitably secured together as at 94 and between which the upwardly and downwardly facing leathers 96 and 98 are secured. Suitable coil springs 100 and 102 normally urge the upwardly and downwardly directed free edges of the leathers toward the cylinder walls, said springs being suitably retained in the upper and lower cover plates as by the housing members 104 and 106. Pistons 86 and 88 are provided with upwardly extending piston rods 108 and 110, said piston rods being fixedly secured thereto as at 112 and 114.

The piston rods 108 and 110 extend through suitable stuffing boxes 116 and 118 provided in the top cover plate, which stuffing boxes may be of any suitable construction such as those including upwardly flanged leathers 120, the upwardly extending flanges thereof engaging the piston rods and normally urged toward said rods by means of the coil springs 122 housed in the substantially U shaped retainer 124 fixed in the cover plate by means of the hollow nut 125 threaded or otherwise secured to the top cover plate. The piston rods 108 and 110 are secured as at 126 and 128 to the inwardly directed flanges 130 and 132 of the piston couplings 134 and 136. The coupling 134 is pivotally connected as at 137 to the pinion crank 138 fixed to the pinion 140. The coupling 136 is pivotally connected as at 142 through an elongated slot 143 with the pinion crank 144 which has the pinion 146 pivoted thereto.

The pinions 140 and 146 are pivotally mounted on the bearings 148 and 150 of the cranks 152 and 154 fixed at opposite ends of the horizontally extending shaft 156. The pinions 140 and 146 mesh with the teeth of the internal ring gears or vertically disposed circular racks 158 and 160 for guidable rotation therein, the pitch diameter of said pinions being one-half the pitch diameter of said racks, and the effective crank arm of cranks 138 and 144 being substantially one-half the pitch diameter of said pinions. The cranks 152 and 154 are set at 90 degrees to each other and the shaft 156 is journaled in the spaced bearings 162 and 164.

The bearings 162 and 164 are disposed to be supported in the supporting member 166 secured as at 168 to the top cover plate and the bearings are secured to said support by means of the transversely extending yoke 170 secured to said support 166 as at 172. A bevel gear 174 is fixed to the shaft 156 within the yoke and meshes with the bevel gear 176 secured to the vertically extending shaft 178 journaled as at 180 in the yoke 170. The shaft 178 is adapted to be secured as through the connection 182 to the meter shaft 184, said meter shaft extending through a suitable stuffing box 186 provided in the top closure member 46, the meter shaft being adapted to be secured to a suitable registering mechanism to be actuated by the meter.

The pinion 174 also meshes with the pinion 188 fixed to the vertically extending valve or jack shaft 190. The pinion 188 is secured as at 192 to the upper rotatable member 194 of the thrust bearing 196, the lower stationary member 198 thereof being secured to the support 166 as at 200. The shaft 190 extends through the member 198 and is provided with the valve positioning member 202 secured thereto, said positioning member being provided with the centrally disposed pin 204 adapted to be received in a suitable socket 206 of the rotatable valve member 208. The valve member 208 (Figures 13 through 16) is provided with the dome 210 having the radially disposed flared outlet chamber 212 disposed therein, the chamber 212 being so constructed and arranged, i. e., of such circumferential length, adjacent its periphery that when the valve is traveling from one port to a second port the second port will just begin to crack or open when the rear or following edge of the valve is in line with the rear edge of said first port. The valve is also provided with the opening 214 proportioned in the same manner.

The valve is provided with diametrically opposed sockets 216 and 218 for reception of a suitable U shaped operating means connected to the shaft 190, in the event such is used, but in the embodiment shown securing brackets 220 and 222 are provided on opposite sides of the plane 14—14 as viewed in Figure 13, said brackets being adapted to be pivoted to the diagonally disposed links 224 and 226 and pivoted as at 228 and 230 to the lower trailing ends of said links. The upper leading ends of said links are pivoted as at 232 and 234 to the member 202.

With such construction it will be seen that the pressure on the top of the valve seat is relieved as the load is taken partially through the thrust bearing 196, yet at the same time the sloping links permit proper seating of the valve. This valve mounting also prevents sticking of the valve for should a tendency for sticking occur, the links will tend to lift or cock or tip the valve, or a portion thereof, so that release is obtained in a direction substantially normal to the seat as well as by the torque. By this valve mounting and drive it has been found that wear is distributed equally over the entire valve seat.

Assuming the meter to be in a position where the piston 88 has discharged liquid from above said piston, and the cylinder 54 below said piston is entirely filled with liquid, and the piston 86 is substantially midway of its stroke, the cylinder 52 above and below said piston being filled with liquid, and let it further be assumed that liquid is being supplied through the inlet 47 from a suitable pump or other source, the valve 208 will be in a position where the cylinder 52 below the piston 86 is connected with the inlet 47 through the passages 214, 68, 72 and 76 and continued supply of liquid to the lower side of the piston 86 will force said piston 86 upwardly, thus continuing the measured discharge from above said piston. The outlets 64 and 66 will be connected through the passage or dome 212 of valve 208 with the upper side of piston 86 through the passage 58. The piston 86 being connected through the piston rod 108 with the pinion 140 will cause rotation of the pinion and movement of the pinion along the ring gear 158, rotating the shaft 156. Rotation of the shaft 156 causes the bevel gear 174 to rotate the meter shaft 184 through the bevel gear 176, shaft 178, and connection 182, whereby registration of the liquid dispensed on suitable registering means may be observed. Rotation of the shaft 156 will likewise rotate the shaft 190 through the bevel gear 188, causing the valve 208 to be rotated through the links 224 and 226. The rotation of the shaft 156 will likewise cause rotation of the crank 154 and consequently the pinion 146 will be caused to travel on its ring gear 160, causing downward movement of the piston rod 110 and the piston 88.

Rotation of the valve 208 will cause the port 68 to be gradually closed and the port 60 to be gradually opened permitting the flow of liquid into the cylinder 54 above the piston 88. The port 58 will likewise gradually be closed and the port 70 will gradually be opened so that the liquid below the piston 88 will be discharged, and liquid supply below the piston 86 will gradually be cut off as the piston nears the top of its stroke. This operation will occur until adjacent the top of the stroke of the piston 86, and as the piston 88 nears its mid stroke, the port 58 will be entirely cut off from the outlet and the port 68 will be entirely cut off from the inlet, in which position the inlet 60 to the top of the piston 88 will be entirely open to the inlet 47 and the port 70 to the bottom of the piston 88 will be entirely open to the outlet 66. Continued supply of liquid will cause the cycle of operation to be repeated.

In order to adjust or calibrate the meter in the construction illustrated in Figure 1, the dome 46 is provided with a recess 236 internally threaded as at 238 for receiving complementary threads of the closure cap 240. An adjusting pin 242 extends into the dome in vertical alignment with the hub of the coupling 136 and the pin 242 is threaded as at 244 into the dome, being locked in position by means of a lock nut 246.

Inasmuch as the coupling 136 is connected through a slot connection to the pinion crank 144, longitudinal movement of the piston rod 110, and consequently the piston 88, is controlled by the length of the adjusting pin 242 disposed in the dome. Thus, the shorter the pin the longer the stroke, and consequently the capacity of the cylinder 54 is increased. Lengthening the pin of course decreases the stroke of the piston 88 in the cylinder 54. A similar adjustment may be applied to the piston 86.

In Figures 17 and 18 a different form of adjustment is illustrated. The meter in this case is similar in all respects to the meter described in Figures 1 to 16 inclusive, with the exception that the connection between the piston coupling 134 and 136 and the respective pinion cranks is a simple non-adjustable pivotal connection. In this case the piston 248 is connected to the piston rod 108 in the cylinder 52. The piston is provided with the upper and lower flanged leathers 250 and 252, backed by the springs 254 and 256 disposed in the retainer plates 258 and 260, the piston assembly being completed by the fastening means 262.

The upper retainer plate 258 is provided with the small or calibrating cylinder 264 extending below the piston 248, the end thereof being partially closed by the cap 266 threaded as at 268 to the end of the cylinder. Within the cylinder 264 the small or calibrating piston 270 is slidably mounted, said piston being provided with the upper and lower flanged leathers 272 and 274, backed by means of the springs 276 and 278. The spring 278 is retained by the abutment member 280, the end 282 of which extends through the enlarged aperture 284 provided in the member 286. The abutment member is secured to the member 286, completing the piston assembly, said member being provided with fingers 288 extending through suitable enlarged apertures 290 provided in the member 266, said fingers being adapted to contact the upper closure member of the cylinder 52 so that at the upper stroke of the piston 246 the piston 270 will always be forced to the lower end of the cylinder 264.

The member 34 forming the bottom closure for the meter is provided with the adjusting screw 292 threaded in said closure member and extending through the end of the cylinder 52 and being adapted to be engaged by the projecting member 282 of the abutment 280. The adjusting screw 292 is provided with the head 294 having suitable notched or cutout portions 296 therein adapted to be engaged by the spring finger 298 secured as at 300 to the closure member 34, the spring finger 298 engaging in the cutout portions 296 of the head, preventing slippage of the adjusting screw after it has once been set. A closure cap 302 is also preferably provided, threaded to the closure member 34 as at 304. It will thus be seen that in order to effect adjustment the closure member 302 is first removed and the adjusting screw 292 may then be threaded inwardly or outwardly by the head 294 to effect the proper calibration, the longer or shorter travel of the adjusting piston 270 serving to decrease or increase the cubic contents of the cylinder. It is, of course, understood that while this adjustment is shown as applied to only one piston, it may be applied to both of the pistons.

Referring now to Figure 19, a horizontal type of meter is shown, of the conventional type, with an adaptation of the piston calibrating means as shown and described in Figures 17 and 18 being applied thereto. In this meter the meter casing 306 is provided with the bottom closure plate 308 secured thereto as at 310. The meter casing is shown for a piston meter, wherein two pairs of aligned pistons are used, but as only the piston calibrated means is to be specifically described, and as preferably only one piston carries the adjustment, only one pair of cylinders and pistons need be shown and specifically described.

The outer ends of the cylinders 312 and 314 are closed by means of the closure plates 316 and 318 secured to the casing as at 320 and 322. The outer ends of the cylinders 312 and 314 communicate through passages 324 and 326 with the ports 328 and 330 of the valve seat. A rotary valve 332 controls the inlet and outlet to and from the cylinders 312 and 314. The rotary valve is connected through the U shaped member 334 to the meter shaft 336 extending through a suitable stuffing box 338 provided in the valve dome 340, said valve dome being secured as at 342 to the cylinder casing and having the inlet (not shown) adapted to be connected to a suitable source of supply as through a pump. The valve is connected through the connection 344 with the shaft 346, said shaft extending downwardly and being mounted on the bearings 348. The end of the shaft is provided with a crank 350 having a connection to the piston rod 358 through the pin and slot connection, or the scotch yoke connections 360 and 361, the latter being for the angularly arranged pistons (not shown).

The piston 362 mounted in the cylinder 312 is of the non-adjustable type being provided with a piston leather 364 backed by means of the coil spring 366 retained in position by means of the plate 368, the assembly being completed by the securing means 370, the piston being secured to the piston rod 358 as at 372. The piston 374 mounted in the cylinder 314 is of the adjustable type, though it is of course understood that more than one adjustable piston may be used. The piston 374 is likewise provided with a piston leather 376, backed by means of a coil spring 378 retained by the retainer plate 380 which secures the entire piston assembly to the piston rod 358 as at 382. The piston rod 358 is provided with a cylinder 384 extending through the piston 374, the cylinder being provided with the adjusting piston 386 slidably mounted therein and having one or more apertures 387 on the closure side of the cylinder 384 to permit displacement therethrough. The piston 386 is provided with the flanged leather 388 sealed by means of the spring 390 which is retained by the fitting 392 threaded or otherwise suitably connected to the piston 386. The piston 386 is provided with piston rod 394 having the head 396 thereon which is movably mounted in the adjusting sleeve 398, threaded as at 400 through the cover member 318 and prevented from movement by the locking plunger 402 backed by means of the spring 404 which is retained by the member 406. The end of the sleeve 398 is closed by the cap 408 (set together by means of litharge) by means of which the inward or outward position of the sleeve can be regulated. A closure member 410 is threaded as at 412 to the closure member 318, and it is necessary to remove the member 410 in order to adjust the travel of the adjusting piston through adjustment of the member 408, and consequently the sleeve 398.

A suitable outlet to dispensing means is shown at 405, said outlet being connected to the cylinder casing adjacent the bottom thereof (not shown) and between the pistons whereby liquid forced from one of the cylinders may pass through one of the channels 324 or 326 through the valve 332, and downwardly through the passages 407 or 409 to the outlet, rotation of the valve through the crank 350 causing rotation of the meter shaft 336 and operation of the registering means.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:—

1. In a meter, the combination of a cylinder having a passage from each end thereof, a valve rotatable to control flow to and from each passage, a meter shaft operatively connected to said valve and adapted to be rotated when said valve is rotated, a piston slidably mounted in said cylinder, a piston rod connected to said piston, means connecting said piston rod and said valve and so constructed and arranged that movement of said piston controls rotation of said valve, said means including a crank rotatable to rotate said valve, a pinion rotatably mounted on said crank, a connection between said crank and piston rod, and means for causing rotation of said pinion and crank upon movement of said piston.

2. In a meter, the combination of a cylinder having a passage from each end thereof, a valve rotatable to control flow to and from each passage, a meter shaft operatively connected to said valve and adapted to be rotated when said valve is rotated, a piston slidably mounted in said cylinder, a piston rod connected to said piston, means connecting said piston rod and said valve and so constructed and arranged that movement of said piston controls rotation of said valve, said means including a crank rotatable to rotate said valve, a pinion rotatably mounted on said crank, a connection between said crank and piston rod, and means for causing rotation of said pinion and crank upon movement of said piston, said last named means including a ring gear meshing with said pinion.

3. In a meter, the combination of a cylinder having a passage from each end thereof, a valve rotatable to control flow to and from each passage, a meter shaft operatively connected to said valve and adapted to be rotated when said valve is rotated, a piston slidably mounted in said cylinder, a piston rod connected to said piston, means connecting said piston rod and said valve and so constructed and arranged that movement of said piston controls rotation of said valve, said means including a crank rotatable to rotate said valve, and a pinion and ring gear assembly interposed between said crank and piston rod and operatively connected thereto.

4. In a meter, the combination of a cylinder having a passage from each end thereof, a valve rotatable to control flow to and from each passage, a meter shaft operatively connected to said valve and adapted to be rotated when said valve is rotated, a piston slidably mounted in said cylinder, a piston rod connected to said piston, means connecting said piston rod and said valve and so constructed and arranged that movement of said piston controls rotation of said valve, said means including a rotatable member rotatable to rotate said valve, a stationary guide member operatively connected to said rotatable member for causing rotation of said rotatable member upon movement of said rotatable member by said piston rod, and a connection between said rotatable member and said piston rod.

5. In a meter, the combination of a cylinder having a passage from each end thereof, a valve rotatable to control flow to and from each passage, a rotatable shaft connected to said valve to control rotation thereof, a crank connected to said shaft, a piston slidably mounted in said cylinder and having a piston rod, and means connecting said piston rod and said crank, said means including a stationary guide member and a rotatably mounted member engaging said guide member.

6. In a meter, the combination of a cylinder having a passage from each end thereof, a valve movable to control flow to and from each passage, a meter shaft operatively connected to said valve and adapted to be rotated by movement of said valve, a piston slidably mounted in said cylinder, a piston rod connected to said piston, means connecting said piston rod and said valve and so constructed and arranged that movement of said piston controls movement of said valve, said means including a crank rotatable to move said valve, a pinion rotatably mounted on said crank, a loose connection between said crank and piston rod, means for rotating said pinion and crank upon movement of said piston, and an adjustable stop adapted to engage said connection for selectively adjusting the stroke of said piston.

7. In a meter, the combination of a casing having a cylinder, said cylinder having a passage from each end thereof, said casing having a valve seat, a valve rotatable on said seat to control flow to and from each passage, a rotatable shaft, a connection between said shaft and valve to control rotation thereof, said connection including a link, one end of said ling being pivotally connected to said valve and the other end of said link being pivotally connected to said shaft, said link being so disposed as to tend to free said valve from said seat in the event said valve should stick, a crank connected to said shaft, a piston slidably mounted in said cylinder and having a piston rod, and means connecting said piston rod and said crank.

8. In a meter, the combination of a casing having a pair of parallel cylinders therein, a valve seat disposed between said cylinders, a passage from the top and bottom of each cylinder extending to said valve seat, an outlet passage from said seat, said first named passages being disposed circumferentially of said seat and radially of said outlet passage, a rotatable valve having a discharge passage therein adapted to serially connect said outlet passage to said other passages, said valve having an inlet opening therethrough for serial communication with said first named passages for permitting flow of liquid thereto, said casing having an inlet thereto disposed above said valve, a piston slidably mounted in each of said cylinders and having a piston rod extending outwardly of said cylinders, a rotatable shaft so disposed that the axis of said shaft is normal to the center lines of said cylinders, a connection between said shaft and valve for rotating said valve proportionately to the rotation of said shaft, and a connection between said shaft and each of said piston rods, each of the last named connections including a rack and pinion.

9. In a meter, the combination of a casing having a pair of parallel cylinders therein, a valve seat disposed between said cylinders, a passage from the top and bottom of each cylinder extending to said valve seat, an outlet passage from said seat, said first named passages being disposed circumferentially of said seat and radially of said outlet passage, a rotatable valve having a discharge passage therein adapted to serially connect said outlet passage to said other passages, said valve having an inlet opening therethrough for serial communication with said first named passages for permitting flow of liquid thereto, said casing having an inlet thereto disposed above said valve, a piston slidably mounted in each of said cylinders and having a piston rod extending outwardly of said cylinders, a rotatable shaft so disposed that the axis of said shaft is normal to the center lines of said cylinders, a connection between said shaft and valve for rotating said valve proportionately to the rotation of said shaft, a connection between said shaft and each of said piston rods, each of the last named connections including a crank connected to said shaft, a stationary circular rack, a pinion meshing with said rack and pivoted to said crank, one of said piston rods being eccentrically pivoted to its adjacent pinion and the other of said piston rods being pivoted to its adjacent pinion through a loose connection, and an adjustable member provided on said casing and engageable by the loose connection to limit the stroke of said last named piston rod.

10. In a meter, the combination of a casing having a pair of parallel cylinders therein, a valve seat disposed between said cylinders, a passage from the top and bottom of each cylinder extending to said valve seat, an outlet passage from said seat, said first named passages being disposed circumferentially of said seat and radially of said outlet passage, a rotatable valve having a discharge passage therein adapted to serially connect said outlet passage to said other passages, said valve having an inlet opening therethrough for serial communication with said first named passages for permitting flow of liquid thereto, said casing having an inlet thereto disposed above said valve, a piston slidably mounted in each of said cylinders and having a piston rod extending outwardly of said cylinders, a rotatable shaft so disposed that the axis of said shaft is normal to the center lines of said cylinders, a jack shaft geared to be rotated by said shaft, a thrust bearing supporting said jack shaft, connecting means between said jack shaft and valve, said connecting means including spaced links disposed on opposite sides of the vertical axes of said valve and jack shaft, said links being upwardly inclined and having the upper leading ends pivoted to said jack shaft and having the lower following ends pivoted to said valve whereby said links tend to cause said valve to tip to free said valve should it stick, and a connection between said first mentioned shaft and each of said piston rods.

11. In a meter, the combination of a casing having a pair of parallel cylinders therein, a valve seat disposed between said cylinders, a passage from the top and bottom of each cylinder extending to said valve seat, an outlet passage from said seat, said first named passages being disposed circumferentially of said seat and radially of said outlet passage, a rotatable valve having a discharge passage therein adapted to serially connect said outlet passage to said other passages, said valve having an inlet opening therethrough for serial communication with said first named passages for permitting flow of liquid thereto, said casing having an inlet thereto disposed above said valve, a piston slidably mounted in each of said cylinders and having a piston rod extending outwardly of said cylinders, a rotatable shaft so disposed that the axis of said shaft is normal to the center lines of said cylinders, a jack shaft geared to be rotated by said shaft, a thrust bearing supporting said jack shaft, connecting means between said jack shaft and valve, said connecting means including spaced links disposed in opposite sides of the vertical axes of said valve and jack shaft, said links being upwardly inclined and having the upper leading ends pivoted to said jack shaft and having the lower following ends pivoted to said valve whereby said links tend to cause said valve to tip to free said valve should it stick, and a connection between said first mentioned shaft and each of said piston rods.

12. In a meter, the combination of a casing having a pair of parallel cylinders therein, a valve seat disposed between said cylinders, a passage from the top and bottom of each cylinder extending to said valve seat, an outlet passage from said seat, said first named passages being disposed circumferentially of said seat and radially of said outlet passage, a rotatable valve having a discharge passage therein adapted to serially connect said outlet passage to said other passages, said valve having an inlet opening therethrough for serial communication with said first named passages for permitting flow of liquid thereto, said casing having an inlet thereto disposed above said valve, a piston slidably mounted in each of said cylinders and having a piston rod extending outwardly of said cylinders, a rotatable shaft so disposed that the axis of said shaft is normal to the center lines of said cylinders, a jack shaft geared to be rotated by said shaft, a thrust bearing supporting said jack shaft, connecting means between said jack shaft and valve, said connecting means including spaced links disposed in opposite sides of the vertical axes of said valve and jack shaft, said links being upwardly inclined and having the upper leading ends pivoted to said jack shaft and having the lower following ends pivoted to said valve, and a connection between said first mentioned shaft and each of said piston rods, said connection including a crank connected to said shaft, a stationary circular rack, a pinion meshing with said rack and pivoted to said crank, one of said piston rods being eccentrically pivoted to said pinion.

13. In a meter, the combination of a casing having a cylinder, said cylinder having a passage from each end thereof, said casing having a valve seat, a valve rotatable on said seat to control flow to and from each passage, a rotatable shaft, a connection between said shaft and valve to control rotation thereof, said connection including a tension member, said tension member being operatively connected to said valve and to said shaft, said tension member being so disposed as to tend to free said valve from said seat in the event said valve should stick, a crank connected to said shaft, a piston slidably mounted in said cylinder and having a piston rod, and means connecting said piston rod and said crank.

14. In a meter, the combination of a casing having a cylinder, said cylinder having a passage from each end thereof, said casing having a valve seat, a valve rotatable on said seat to control flow to and from each passage, a rotatable shaft, a connection between said shaft and valve to control rotation thereof, said connection including a plurality of substantially diametrically disposed links inclined in the direction of rotation of said valve, said links being pivoted to said valve and to said shaft, said links being so disposed as to tend to free said valve from said seat in the event said valve should stick, a crank connected to said shaft, a piston slidably mounted in said cylinder and having a piston rod, and means connecting said piston rod and said crank.

15. In a meter, the combination of a casing having a cylinder, a piston slidably mounted in said cylinder, a piston and cylinder construction for varying the discharge from the first named cylinder, said construction including a calibrating cylinder having a calibrating piston mounted therein, the diameter of said calibrating cylinder and piston being less than the diameter of said first named cylinder and piston, respectively, said calibrating cylinder being provided on said first named piston, and adjustment means disposed between said casing and calibrating piston for varying the discharge from said meter.

16. In a meter, the combination of a casing having a cylinder, a piston slidably mounted in said cylinder, a piston and cylinder construction for varying the discharge from the first named cylinder, said construction including a calibrating cylinder having a calibrating piston mounted therein, the diameter of said calibrating cylinder and piston being less than the diameter of said first named cylinder and piston, respectively, said calibrating cylinder being provided on said first named piston, and an adjustable abutment on said casing adapted to be contacted by said calibrating piston for selectively affecting the movement of said calibrating piston for varying the discharge from said meter.

17. In a meter, the combination of a casing having a cylinder, a piston slidably mounted in said cylinder, a piston and cylinder construction for varying the discharge from the first named cylinder, said construction including a calibrating cylinder having a calibrating piston mounted therein, the diameter of said calibrating cylinder and piston being less than the diameter of said first named cylinder and piston, respectively, said calibrating cylinder being provided on said first named piston, said calibrating piston being provided with a member engageable with a portion of said casing when the first named piston is moved toward one end of its stroke to move said calibrating piston toward one end of the calibrating cylinder, and an adjustable abutment member on said casing adapted to be contacted by said calibrating piston when said first named piston is moved toward the other end of its stroke to thereby selectively regulate movement of said calibrating piston for varying the discharge from said meter.

18. In a meter, the combination of a casing having a cylinder, a piston slidably mounted in said cylinder, a piston and cylinder construction for varying the discharge from the first named cylinder, said construction including a calibrating cylinder having a calibrating piston mounted therein, the diameter of said calibrating cylinder and piston being less than the diameter of said first named cylinder and piston, respectively, said calibrating cylinder being provided on said first named piston, and adjustment means disposed between said casing and calibrating piston for varying the discharge from said meter, said adjustment means including a piston rod connected to said calibrating piston, and a movable member provided on said casing and operatively connected to said last named piston rod to selectively control the movement of said last named piston rod and the calibrating piston.

19. In a meter, the combination of a casing having a cylinder, a piston slidably mounted in said cylinder, a piston and cylinder construction for varying the discharge from the first named cylinder, said construction including a calibrating cylinder having a calibrating piston mounted therein, the diameter of said calibrating cylinder and piston being less than the diameter of said first named cylinder and piston, respectively, said calibrating cylinder being provided on said first named piston, and adjustment means disposed between said casing and calibrating piston for varying the discharge from said meter, said adjustment means including a piston rod connected to said calibrating piston, and a movable member provided on said casing and loosely connected to said last named piston rod whereby said last named piston rod and said movable member have limited selective relative movement to selectively control the movement of said last named piston rod and the calibrating piston.

ROSS H. ARNOLD.
FRED. W. STURM.